(12) United States Patent
Hori et al.

(10) Patent No.: US 9,974,251 B2
(45) Date of Patent: May 22, 2018

(54) MULTI-LAYERED AQUAPONICS SYSTEM AND METHOD

(71) Applicant: HORIMASA INTERNATIONAL CO., LIMITED, Kowloon (HK)

(72) Inventors: Masaharu Hori, Tokyo (JP); Mitsuhiro Hotta, Tokyo (JP)

(73) Assignee: HORIMASA INTERNATIONAL CO., LIMITED, Kwun Tong, Kowloon (HK)

( * ) Notice: Subject to any disclaimer, the term of this patent is extended or adjusted under 35 U.S.C. 154(b) by 145 days.

(21) Appl. No.: 14/845,516

(22) Filed: Sep. 4, 2015

(65) Prior Publication Data

US 2016/0113222 A1  Apr. 28, 2016

(30) Foreign Application Priority Data

Oct. 24, 2014  (JP) ................... 2014-217256

(51) Int. Cl.
*A01G 31/06*  (2006.01)
*A01K 63/04*  (2006.01)

(52) U.S. Cl.
CPC .............. *A01G 31/06* (2013.01); *A01K 63/04* (2013.01); *Y02P 60/216* (2015.11); *Y02P 60/642* (2015.11)

(58) Field of Classification Search
CPC ........ A01G 31/06; A01G 31/00; A01K 63/04; A01K 63/00
See application file for complete search history.

(56) References Cited

U.S. PATENT DOCUMENTS

| | | | |
|---|---|---|---|
| 8,839,742 B2* | 9/2014 | Bodlovich | C02F 3/32 119/226 |
| 8,966,816 B2* | 3/2015 | Toone | A01G 31/02 119/246 |
| 2010/0031893 A1* | 2/2010 | Bodlovich | C02F 3/32 119/227 |
| 2011/0296757 A1* | 12/2011 | McGrath | A01G 31/02 47/62 R |
| 2013/0047508 A1* | 2/2013 | Toone | A01G 31/02 47/62 R |
| 2013/0098303 A1 | 4/2013 | Jones | |
| 2013/0160363 A1 | 6/2013 | Whitney et al. | |
| 2014/0041594 A1 | 2/2014 | Plante | |
| 2014/0047767 A1* | 2/2014 | Bodlovich | C02F 3/32 47/62 N |
| 2014/0366443 A1* | 12/2014 | Brusatore | A01G 31/06 47/66.7 |

* cited by examiner

*Primary Examiner* — Kristen C Hayes
(74) *Attorney, Agent, or Firm* — Egbert Law Offices, PLLC

(57) ABSTRACT

A multi-layered aquaponics system used for cultivation has a fish tank, at least one layer of a grow bed adapted to support growth of at least one variety of plant in a direction substantially vertical to a plane of a backing element of the layer, a growth light system having at least one LED growth-light fixture disposed above the grow bed, a water supply system having a water circulation loop, and an aeration system without a power source. The aeration system includes a standpipe inside the layers of grow beds and a plurality of bell siphons positioned within the standpipe and connected to a water drainpipe.

10 Claims, 1 Drawing Sheet

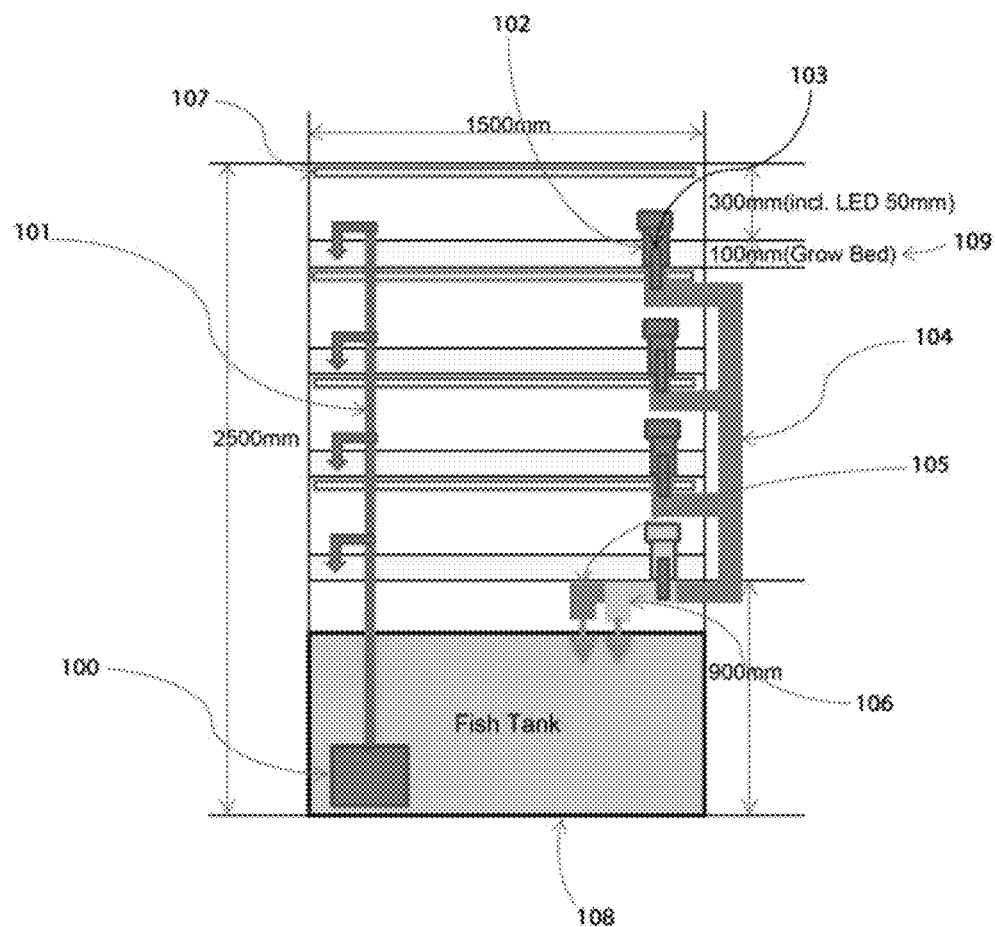

MULTI-LAYERED AQUAPONICS SYSTEM AND METHOD

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

This invention is in the area of aquaponics cultivation for sustainable farming.

2. Description of Related Art Including Information Disclosed Under 37 CFR 1.97 and 37 CFR 1.98

There are many indoor hydroponics system using vertical farming method but it is not possible for hydroponics to grow organic vegetables because they need chemical nutrient to grow the crops. Also these hydroponics systems cannot be used as an aquaponics due to its draining design. Also, an air pump and timer are necessary to control the water drain and/or the overflown.

It is desirable, from the aspect of energy saving, to have a system in which a significant amount of strong water flow created by Bell Siphon provides good aeration with sufficient oxygen in the drained water without the need of air pump and/or timer to control the drain. In other words, the multiple usage of Bell Siphon in the drainage system of each layer enables vertical cultivation without any power unit and/or timer to control the drain and/or the overflown.

Traditionally, aquaponics farmers use Bell Siphon in single layered grow bed and yet there are still technical problems on not enough aeration be supplied to both vegetable roots (in growing media such as hydroton or black cinder) and fishes.

The invention is primarily doing with vertical cultivation using multi-layered aquaponics system and method. Prior inventions are compared with the present invention. They are described below.

The US patent publication number US20130047508A1 discloses a modular aquaponics assembly including a frame, at least one tray adapted for retaining water and supporting at least one container for retaining a growing medium therein for support plants. In short, the said US patent provides embodiments of an aquaponic system with Bell Siphon and multi-layered tray.

The above invention provides embodiments of a aquaponic system with Bell Siphon and multi-layer tray. However, the above invention does not provide any information related to the choice of grow light, and does not mention the use of LED grow light and strong water current in contact with air created by the Bell Siphon that give suitable aeration. Also, the layered structure in the above patent is different from the multi-layered structures in the present invention.

This invention provides LED growth-lights on multi-layers of cultivation grow-beds and the deployment of at least one Bell Siphon in the vertical structure, thus creating strong water current giving suitable aeration back to the fish tank.

The US patent publication number US20140041594A1 discloses an aquarium module, a garden module, and a reservoir module. As a whole, the system is generally designed such that the wastewater from the aquarium module flows to the garden module where it irrigates the plants and where it is at least partially filtered by plants, which consume at least some of the waste products contained in the water. In short, this invention provides the embodiments of an aquaponic system with Bell Siphon and multi-layer tray. The garden module is located at a level lower than the water level of the aquarium module.

However, the above invention utilizes natural light as the light source, instead of providing LED grow light. Also, the above invention does not disclose an aquaponic system where the plant grow-bed is being located above the fish tank, and does not utilize the Bell Siphon to give suitable aeration into the fish tank. Further, the above patent does not resolve the technical problem of providing sufficient aeration in a closed-loop system.

In the present invention, the aquaponic cultivation system and method, where the multi-layered plant grow-beds are being located above the fish tank, allowing water from all layers to be drained together into the fish tank, except the water in the lowest's layer of the grow-bed that is drained separately into the fish tank.

The US patent publication number US20130160363 provides a closed-loop, vertical garden system for growing plants and filtering air and water comprising multi-layer grow media for use in vertical aquaponic gardens.

However, the above patent's food production system does not provide any application of and draining system nor Bell Siphon draining system nor multi-layered grow bed. Also, the above patent does not disclose the use of LEDs as light source. Further, the above patent does not specify any number of layers used in the multi-layer grow media. Again, the above patent does not resolve the technical problem of providing sufficient aeration in a closed-loop system.

The present invention provides LED growth-lights on multi-layers of cultivation grow-beds. Each level of grow-bed also has its own drainage standpipe that leads the overflown to the water drain pipe and eventually to the fish tank. Specifically, when the overflown from grow-beds is drained through the Bell Siphon, strong water current is created by the Bell Siphon that gives suitable aeration back to the fish tank.

The US patent publication number US20140047767 provides an aquaponics system and method. It provided an aquaponics system including a tank for aquatic animal, plant growing apparatus; and a biofilter and a biological waste digestion unit. Plant nutrients are transferred to the plant growing apparatus and at least a portion of the water is returned to the tank.

However, the above invention does not provide LED growth lights on multi-layers of cultivation growth-beds. The above invention also doesn't have its own drainage standpipe that leads the overflow of each level of growth-bed to the water drain pipe and eventually to the fish tank. Specifically, the said invention did not mention the use of Bell Siphon in its drainage system.

The present invention provides LED growth-lights on multi-layers of cultivation grow-beds. Each level of grow-bed also has its own drainage standpipe that leads the overflown to the water drain pipe and eventually to the fish tank. Specifically, when the overflown from grow-beds is drained through the Bell Siphon, strong water current is created by the Bell Siphon that gives suitable aeration back to the fish tank in which aeration system could save energy, carbon-free and friendly to the environment.

The US patent publication number US20130098303 provides a sustainable aquaponic system and method using alternative aquaculture feed. Though this patent provides a vertical aquaponic system, it derives its water from an open, natural, established pond or lake ecosystem instead of a fish tank. Bell siphon is also involved in this invention, but merely as a role in water drainage. It relies on alternative aeration methods such as the use of various plants in and near the water and domestic plants.

With regard to the present invention, water aeration is achieved by strong current created by bell siphon. However, by adjacent or side by side raceway installation, the above patent's water can fall over the long side of the raceway through pea gravel or hadite (expanded shale) to the long side of an adjacent fish raceway. This process provides oxygenation as well as abolic removal of ammonia and repeats the cycle raceway after raceway until the water empties into the largest grow bed of the system. Clearly, though the above patent application and the present invention both make use of water flow to aerate the fish tank/fish pond, the present invention achieves aeration by the simple and multiple use of at least one bell siphon in a vertical structure, the patent above achieves aeration by raceway installation, with the presence of pea gravel or hadite (expanded shale).

BRIEF SUMMARY OF THE INVENTION

The present invention provides a multi-layered aquaponics system for cultivation. The present invention also discloses an aquaponics cultivation method in an indoor vertical farming.

BRIEF DESCRIPTION OF THE SEVERAL VIEWS OF THE DRAWINGS

Further aspects of the present invention will be more readily appreciated upon review of the detailed description of its embodiment, provided below, when taken in conjunction with the accompanying drawing, of which:

FIG. 1 is a drawing illustrating the multi-layered aquaponics system, including its components, and an aquaponics cultivation method in an indoor vertical farming.

DETAILED DESCRIPTION OF THE INVENTION

Problem Intended to be Solved

The invention provides both the multi-layered aquaponics system and an aquaponics cultivation method in an indoor vertical farming.

In such aquaponics system, aeration and oxygen content can be a critical element when rearing fish. In the present invention, the multi-layered aquaponics system is designed to improve the addition of oxygen to water supplied the fish tank by deploying a suitable aeration system consuming no power, thus friendly to the environment.

Technical Description

With regard to the multi-layered aquaponics system, this invention provides a food production system that combines conventional aquaculture with hydroponics in a symbiotic environment. Since aquaponics uses no herbicides, pesticides, or other chemicals, fish and vegetables produced are 100% natural and organic.

The Multi-layered Aquaponics System

FIG. 1 illustrates the multi-layered aquaponics system and describes an aquaponics cultivation method in an indoor vertical farming.

Referring to FIG. 1, the entire system comprises the following components, namely, (1) the fish tank 108, (2) the submersible pump 100, (3) water supply pipe to grow-bed 101, (4) grow-bed 109, (5) "Bell Siphon" 103, (6) Standpipe 102, (7) water drain pipe 104, (8) upper layers' water drain pipe 105, (9) lowest layer's water drain pipe 106, and (10) light emitting diodes (LEDs) growth-light 107, which is attached to each layer of grow-beds. The application of the said system is illustrated through the aquaponic cultivation method below.

Referring to FIG. 1, there are five layers in the diagram in FIG. 1 in one possible embodiment of this multi-layered aquaponics system, with four layers being plant grow-beds 109 on the top and one layer being the fish tank 108 located at the lowest level touching the ground surface. The number of layers of grow-beds in the multi-layered aquaponics system can be one or more. The submersible pump 100 is arranged inside the fish tank and is configured to pump water from the water source in the fish tank. Water supply pipe to grow-beds 101 is vertically raised to connect and carry the water pumped by the submersible pump 100 to each layer of grow-bed 101.

The multi-layered aquaponics system further comprise of a water circulation system which circulates water from the fish tank through at least one layer of grow-bed and back to the fish tank, forming a water circulation loop.

Such water circulation loop forms a recirculation of aquaponic systems, which requires the water in the system be pumped and recirculated, within the system on continual basis.

In addition, the multi-layered aquaponics system can contain at least one tray adapted for retaining water support by the frame, the tray can be further adapted for supporting at least one container for retaining a growing medium for supporting plants.

Referring to FIG. 1, each layer of grow-bed 109 supports the growth of one or more varieties of plants in a direction substantially vertical to the plane of the backing element of each layer and distributes water to the roots of the plants through a drainage system.

Each layer of grow-bed 109 is attached to the water supply pipe 101 so that water can be supplied for cultivation. Each layer consists of LED growth-light 107 as a source of light for cultivation. The light fixture can be disposed within the aquaponics system above at least one layer.

Each layer of grow-bed containing a drainage system which is arranged along the side of the fish tank and each layer of grow-bed, and consists of a standpipe 102 where Bell Siphon 103, configured to automatically regularly substantially supply water and air to the fish tank, is located inside, and a water drain pipe 104. Each layer of grow-bed contains a Bell Siphon which are arranged at the side of the fish tank.

In a preferred embodiment, such bell siphons in the multi-layered aquaponics system can be aligned to each other vertically as shown in FIG. 1. Further, each bell siphon can be individually connected to a vertically deployed common water drain pipe where the overflown from each layer of grow-bed is drained through the drainage system to the fish tank through such common water pipe.

In a preferred embodiment, bell siphon from all layers of grow-beds, except the grow-bed immediately above the fish tank, can be connected to a vertically deployed common water drain pipe and bell siphon from the grow-bed immediately above the fish tank can be connected to another water drain pipe. In this way, drained water from all layers of grow-bed, except the grow-bed immediately above the fish tank i.e. the lowest layer, is drained together through upper layers' water drain pipe 105, i.e. the vertically deployed common water drain pipe. By the foregoing vertically alignment of the bell siphons, as the common water pipe drains water from all layers of grow-beds, such common water pipe drains relatively strong water current, giving suitable aeration into the fish tank. Drained water from the grow-bed immediately above the fish tank is drained into the fish tank separately and returns to the water source through the lowest layer's water drain pipe 106. Drained water from the lowest layer is not drained to the common water drain pipe before flowing to fish tank, thus such lowest layer's water drain pipe can be arranged shorter. The use of shorter water pipe deployed at the lowest layer means less height from the lowest layer of grow-bed to bottom of fish tank for same volume of water in fish tank, which can save overall space of the system. In addition, the use of shorter pipe allows a shorter water supply pipe to lowest grow-bed and hence the upper layers of grow-bed, which saves power of pumping water upwards to the grow-beds.

Sizes and Dimensions of the Components of the System

With respect to FIG. 1, in a preferred embodiment, a system with 4 layers of grow-bed and a fish tank will have a height of 2500 mm.

Preferably, the height of each layer of grow-bed 109 can be 100 mm and the height of the LED growth-light 107 can be 50 mm. The width of the grow-bed 109 can be 1500 mm and the width of the fish tank can also be 1500 mm. While both the width and the length may vary, it will be a better embodiment to standardize the width and length so as to deploy more multiple systems in a regular-shaped area. The height of the space between the grow-bed and the LED growth-light (including the height of the LED growth-light) can be 300 mm.

The height from the lowest layer of grow-bed to the ground surface, i.e. the bottom of the fishtank, can be 900 mm. Alternatively, the height from the lowest layer of grow-bed to the bottom of the fish tank, can be more than 900 mm.

The height of the system and each layers therein is calculated to bring sufficient aeration to the fish tank, even without power source. Alternatively, the fish tank may be deployed in a larger volume by increasing its width (or length). It will then need more oxygen by stronger water current brought by the downstreamed water. In preferred embodiments, more aeration could be achieved by increasing the number of layers and/or increasing the distance between each bell siphon (attaching to each grow-bed), and thus increasing the height from which the water is poured downstreamed via the common water pipe. The higher is the downstreamed water, the stronger is the water current and the more the aeration. In a further embodiment, the volume of the fish tank can be increased by deploying bigger fish tank and increasing the height from the lowest layer of grow-bed to the bottom of the fish tank.

The Aquaponic Cultivation Method

Regarding to the aquaponic cultivation method, FIG. 1 illustrates that, the water from the fish tank would be drained by the submersible pump 100, through the water supply pipe 101, and distributed to each layer of the plant grow-bed 109. When the water level in one particular grow-bed reaches to the height of the standpipe 102, the excess water or the overflown would then be drained automatically into the water drain pipe 104, which circulates back to the fish tank 108. The overflown from the upper 3 layers in one of the possible embodiment will be drained together through the upper layers' water drain pipe 105 through a vertically deployed common water drain pipe, while the overflown from the lowest layer will be drained separately through the lowest layer's water drain pipe 106 to the fish tank.

Further, before entering the water drain pipe 104, the water would go through the bell siphon 103 which drains the overflown automatically from each layer of grow-bed through the drainage system into a common water drain pipe and aerates drained water by Bell Siphons aligned to each other vertically and connected a common water drain pipe back to the fish tank, so that strong water current created by Bell Siphon allows the drained water to be suitably aerated before entering the fish tank. In other words, Bell Siphon 103 within the drainage system of each layer aerates the drained water before it enters back to the fish tank. Each layer has its own standpipe 102 (containing Bell Siphon 103) to drain water.

Technical Effect or Improvement

From the aspect of energy saving, significant amount of strong water flow created by Bell Siphon in this invention provides good aeration with more oxygen in the drained water without the need of air pump and/or timer to control the drain. In other words, the multiple usage of Bell Siphon in the drainage system of each layer enables vertical cultivation without any power unit and/or timer to control the drain and/or the overflown. Minimum monitoring to the running of the system is achieved. Less power is used and is therefore more environmentally friendly with less carbon.

From the aspect of aquaponic cultivation, this invention can supply enough aeration, through the use of Bell Siphon, to both vegetable roots and the plant growing media/bed can be hydroton or black cinder evenly layed on the bottom of each grow bed and fish. A 100% organic environment is therefore achieved by the present invention. Moreover, this invention improves the control of the aquaponic cultivation environment by using LED growth-lights. Thus, cultivation is possible all year round with no weather effects and the output may be more accurately predicted and guaranteed.

From the aspect of yield production, this invention may increase the productivity of crop yield per area. To illustrate, multi-layered structure enables the use of a given space to cultivation more plants vertically rather than horizontally, which takes up more space area.

We claim:

1. A multi-layered aquaponics system used for vertical cultivation on a ground surface, the multi-layered aquaponics system comprising:
a fish tank positioned at a lowest level so as to touch a ground surface;
at least one layer of a grow bed adapted to support growth of at least one variety of plant in a direction substantially vertical to a plane of a backing element of the layer;
a growth light system having at least one LED growth light fixture disposed above said at least one layer of grow bed;
a water supply system defining a water circulation loop; and
an aeration system without a power source, said aeration system comprising:
a standpipe arranged inside of said at least one layer of grow bed, said standpipe adapted to collect an overflow of water; and
a plurality of bell siphons positioned within said standpipe and connected to a vertically-deployed water drain pipe, said plurality of bell siphons adapted to automatically streamline the water to said fish tank at pre-determined regular intervals, wherein said plurality of siphons are vertically aligned with each other.

2. The multi-layered aquaponics system of claim 1, wherein said at least one layer of the grow bed has a tray adapted to retain the water, said tray supporting at least one container so as to retain a growing medium for the plant.

3. The multi-layered aquaponics system of claim 1, wherein said at least one layer of the grow bed has a tray adapted to retain the water, said tray supporting at least one container, the multi-layered aquaponics system further comprising:
a growing medium in the at least one container, the growing medium selected from the group consisting of hydroton, black cinder, and a blend thereof.

4. The multi-layered aquaponics system of claim 1, said water supply system comprising:
a submersible pump positioned with said fish tank so as to pump water from a water source in said fish tank;
a water supply pipe extending vertically along one side of said fish tank and in said at least one layer of the grow bed so as to carry water pumped by said submersible pump to roots of the plant, said water drain pipe deployed vertically along an opposite side of said fish tank and in said at least one layer of the grow bed so as to collect overflow water and to stream the overflow water into said fish tank.

5. Canadian associates A multi-layered aquaponics system used for vertical cultivation on a ground surface, the multi-layered aquaponics system comprising:
a fish tank positioned at a lowest level so as to touch a ground surface;
at least one layer of a grow bed adapted to support growth of at least one variety of plant in a direction substantially vertical to a plane of a backing element of the layer;
a growth light system having at least one LED growth light fixture disposed above said at least one layer of grow bed;
a water supply system defining a water circulation loop; and
an aeration system without a power source, said aeration system comprising:
a standpipe arranged inside of said at least one layer of grow bed, said standpipe adapted to collect an overflow of water; and
a plurality of bell siphons positioned within said standpipe and connected to a vertically-deployed water drain pipe, said plurality of bell siphons adapted to automatically streamline the water to said fish tank at pre-determined regular intervals, said at least one layer of the grow bed comprising a plurality of layers of grow beds, said plurality of siphons respectively positioned in said plurality of layers of grow beds except for the grow bed immediately above said fish tank, said plurality of bell siphons being connected to said vertically-deployed drain pipe, the grow bed immediately above said fish tank having another bell siphon that is connected to another water drain pipe.

6. The multi-layered aquaponics system of claim 5, each of the plurality of layers of grow beds having a height of 100 millimeters, the LED growth light fixture having a height of 50 millimeters, a distance between the layer of grow bed and the LED growth light fixture being 300 millimeters.

7. The multi-layered aquaponics system of claim 5, said fish tank having a width of 1500 millimeters, each of said plurality of layers of grow bed having a width of 1500 millimeters.

8. The multi-layered aquaponics system of claim 5, a distance from a lower layer of grow bed to a bottom of said fish tank being 900 millimeters, said plurality of layers of grow beds being four layers of grow beds, the multi-layered aquaponics system having a height of 2500 millimeters.

9. The multi-layered aquaponics system of claim 5, said fish tank having a width of greater than 1500 millimeters, a distance from a lowest layer of grow bed to a bottom of said fish tank being greater than 900 millimeters, the multi-layered aquaponics system having a height at greater than 2500 millimeters.

10. The multi-layered aquaponics system of claim 5, said fish tank having a width of greater than 1500 millimeters, a distance from a lowest layer of grow bed to a bottom of said fish tank being 900 millimeters, said plurality of layers of grow bed being more than four layers of grow beds, the multi-layer aquaponics system having a height of greater than 2500 millimeters.

* * * * *